(12) United States Patent
Lautenschlaeger et al.

(10) Patent No.: US 12,224,881 B2
(45) Date of Patent: Feb. 11, 2025

(54) PROCESSING DATA IN AN ETHERNET PROTOCOL STACK

(71) Applicant: Nokia Solutions and Networks Oy, Espoo (FI)

(72) Inventors: Wolfram Lautenschlaeger, Sachsenheim (DE); Ulrich Gebhard, Ludwigsburg (DE)

(73) Assignee: Nokia Solutions and Networks Oy, Espoo (FI)

( * ) Notice: Subject to any disclaimer, the term of this patent is extended or adjusted under 35 U.S.C. 154(b) by 98 days.

(21) Appl. No.: 17/867,946

(22) Filed: Jul. 19, 2022

(65) Prior Publication Data
US 2023/0026435 A1 Jan. 26, 2023

(30) Foreign Application Priority Data

Jul. 20, 2021 (EP) .................................... 21186817

(51) Int. Cl.
*H04L 12/40* (2006.01)
(52) U.S. Cl.
CPC ................................ *H04L 12/4015* (2013.01)
(58) Field of Classification Search
CPC ........................... H04L 12/4015; H04L 12/413
See application file for complete search history.

(56) References Cited

U.S. PATENT DOCUMENTS

| | | | | |
|---|---|---|---|---|
| 6,262,976 B1 * | 7/2001 | McNamara | ............. | H04L 45/02 370/254 |
| 12,047,165 B2 * | 7/2024 | Yi | ......................... | H04J 3/1658 |
| 2002/0097463 A1 | 7/2002 | Saunders et al. | | |
| 2002/0097708 A1 * | 7/2002 | Deng | ................... | H04M 7/1205 370/352 |
| 2003/0137959 A1 * | 7/2003 | Nebiker | ............ | H04M 1/72412 370/352 |
| 2003/0140163 A1 * | 7/2003 | Peshkin | .............. | H04L 12/6402 709/238 |
| 2004/0047353 A1 * | 3/2004 | Umayabashi | ....... | H04L 12/4666 370/395.63 |
| 2004/0109440 A1 * | 6/2004 | Mattathil | .............. | H04M 7/121 370/352 |
| 2019/0273697 A1 * | 9/2019 | Shi | ......................... | H04L 49/351 |
| 2021/0044374 A1 * | 2/2021 | Lin | ..................... | H04J 14/0213 |

(Continued)

FOREIGN PATENT DOCUMENTS

| | | |
|---|---|---|
| EP | 3319254 A1 | 5/2018 |
| WO | 01/31969 A1 | 5/2001 |

OTHER PUBLICATIONS

"Dahina Koulougli, Efficient Routing Using Flexible Ethernet in Multi-Layer Multi-Domain Networks, Apr. 1, 2021, Journal of Kightwave Technlogy, vol. 39, No. 7, pp. 1926-1927" (Year: 2021).*

(Continued)

*Primary Examiner* — Rasheed Gidado
(74) *Attorney, Agent, or Firm* — Harness, Dickey & Pierce, P.L.C

(57) ABSTRACT

A method for processing data in an Ethernet protocol stack is disclosed. The method includes receiving client data for transmission via an Ethernet bus, and selectively transmitting the client data over the Ethernet bus by one of packet switching or non-packet-switching transmission based on an identity of the originating client device.

11 Claims, 7 Drawing Sheets

(56) References Cited

U.S. PATENT DOCUMENTS

2021/0320819 A1* 10/2021 Chen .................... H04L 45/745
2022/0385595 A1* 12/2022 Han ..................... H04L 47/829

OTHER PUBLICATIONS

Office Communication for European Application No. 21 186 817.9 dated May 21, 2024.
European Search Report dated Dec. 21, 2021 issued in European Patent Application No. 21 18 6817.

* cited by examiner

PROCESSING DATA IN AN ETHERNET PROTOCOL STACK

CROSS-REFERENCE TO RELATED APPLICATIONS

This application claims priority to and the benefit of European Patent Application No. 21186817.9 filed on Jul. 20, 2021, the entire contents of each of which are incorporated herein by reference.

FIELD OF THE DISCLOSURE

The present disclosure relates to processing data in an Ethernet protocol stack.

BACKGROUND OF THE DISCLOSURE

Networked devices may communicate across a network using an Ethernet protocol stack. Ethernet advantageously allows efficient use of network bandwidth through packet switching, supports multicast and broadcast traffic, and the network infrastructure is already widely deployed and commonly supported by devices and so is readily available for networking of devices. A disadvantage of conventional Ethernet communications is packet arrival jitter, which results from the sharing of the same medium time-space domain by multiple data channels, whereby contention is resolved by waiting queues, and overloading results in frame or packet dropping. Conventional Ethernet may thus be well suited to efficiently carrying high-volume, time-insensitive, low-integrity data, but less well suited to time-sensitive or otherwise critical data. For example, conventional Ethernet may be unsuited to operational technology (OT) networking, e.g., for communicating controllers and machines in a factory, because such technology typically requires relatively high timing precision and high-integrity communications.

SUMMARY OF THE DISCLOSURE

An objective of the present disclosure is to provide a method for processing data in an Ethernet protocol stack that reduces packet arrival jitter.

In particular, an objective of embodiments described in the disclosure is to provide a means for communicating both conventional Ethernet packet services and time-sensitive, e.g., constant-bit-rate (CBR), services via an Ethernet protocol stack over a shared communication channel.

A first aspect of the present disclosure provides a method for processing data in an Ethernet protocol stack, comprising: receiving client data for transmission via an Ethernet bus, and selectively transmitting the client data over the Ethernet bus by one of packet switching or non-packet-switching transmission based on an identity of the originating client device.

In an implementation, the transmitting the client data by non-packet-switching transmission comprises transmitting the client data by time-division multiplexing transmission.

In an implementation, the selectively transmitting the data by non-packet-switching transmission comprises embedding the client data into a client bit stream and scheduling the client bit stream into Ethernet bus slots.

In an implementation, the embedding client data comprises aligning a bit rate of the client data to a net bit rate of the Ethernet bus, and aligning a gross rate of the Ethernet bus to local clocks of nodes of the Ethernet bus.

In an implementation, the receiving client data from first and second physical layer devices comprising receiving client data from the first physical layer device via a first interface and receiving client data from the second physical layer device via a second interface.

In an implementation, the selectively transmitting the client data comprises defining a grouping of bits of the client data, associating control data defining an identity of the originating physical layer device with the grouping, and transmitting the grouping of client data by one of packet switching or non-packet-switching transmission based on the control data.

In an implementation, the defining a grouping of bits of the client data comprises defining a grouping of a plurality of bits of the client data received from the first physical device, and the selectively transmitting the client data comprises selectively transmitting the grouping of the client data received from the first physical device via non-packet-switching transmission.

In an implementation, the defining a grouping of bits of the client data comprises segmenting packets of client data received from the second physical device, and the selectively transmitting the client data comprises selectively transmitting the segments of the client data received from the second physical device via packet-switching transmission.

In an implementation, the selectively transmitting the client data comprises identifying a slot for transmission of client data via the Ethernet bus, determining whether the slot is required to be used for transmission of client data received from the first physical layer device, and in response to determining that the slot is not required to be used for transmission of client data received from the first physical layer device, transmitting client data received from the second physical layer device in the slot.

A second aspect of the present disclosure provides an apparatus for processing data in an Ethernet protocol stack, comprising means configured to perform: receive client data for transmission via an Ethernet bus, and selectively transmit the client data over the Ethernet bus by one of packet switching or non-packet-switching transmission based on an identity of the originating client device.

In an implementation, the means are further configured to perform transmitting the client data by non-packet-switching transmission by transmitting the client data by time-division multiplexing transmission.

In an implementation, the means are further configured to perform selectively transmitting the data by non-packet-switching transmission by embedding the client data into a client bit stream and scheduling the client bit stream into Ethernet bus slots.

In an implementation, the means are further configured to perform embedding client data by aligning a bit rate of the client data to a net bit rate of the Ethernet bus, and aligning a gross rate of the Ethernet bus to local clocks of nodes of the Ethernet bus.

In an implementation, the means are further configured to perform receiving client data from first and second physical layer devices by receiving client data from the first physical layer device via a first interface and receiving client data from the second physical layer device via a second interface.

In an implementation, the means are further configured to perform selectively transmitting the client data by defining a grouping of bits of the client data, associating control data defining an identity of the originating physical layer device with the grouping, and transmitting the grouping of client data by one of packet switching or non-packet-switching transmission based on the control data.

In an implementation, the means comprises at least one processor, and at least one memory comprising machine-readable instructions executable by the processor to cause the apparatus to perform the operations.

In an implementation the apparatus is included in a switch of a communication network. In an implementation this communication network is an Ethernet network.

A third aspect of the present disclosure provides a computer program comprising machine-readable instructions which when executed by a computer cause the computer to carry out a method of any implementation of the first aspect of the disclosure.

A fourth aspect of the present disclosure provides a computer-readable data carrier having the computer program of the third aspect stored thereon.

The foregoing and other objectives are achieved by the features of the independent claims. Further implementation forms will be apparent from the dependent claims, the description and the Figures.

These and other aspects of the disclosure will be apparent from the embodiment(s) described below.

BRIEF DESCRIPTION OF THE DRAWINGS

In order that the present invention may be more readily understood, embodiments of the disclosure will now be described, by way of example, with reference to the accompanying drawings, in which.

DETAILED DESCRIPTION OF THE DISCLOSURE

Figure 1:
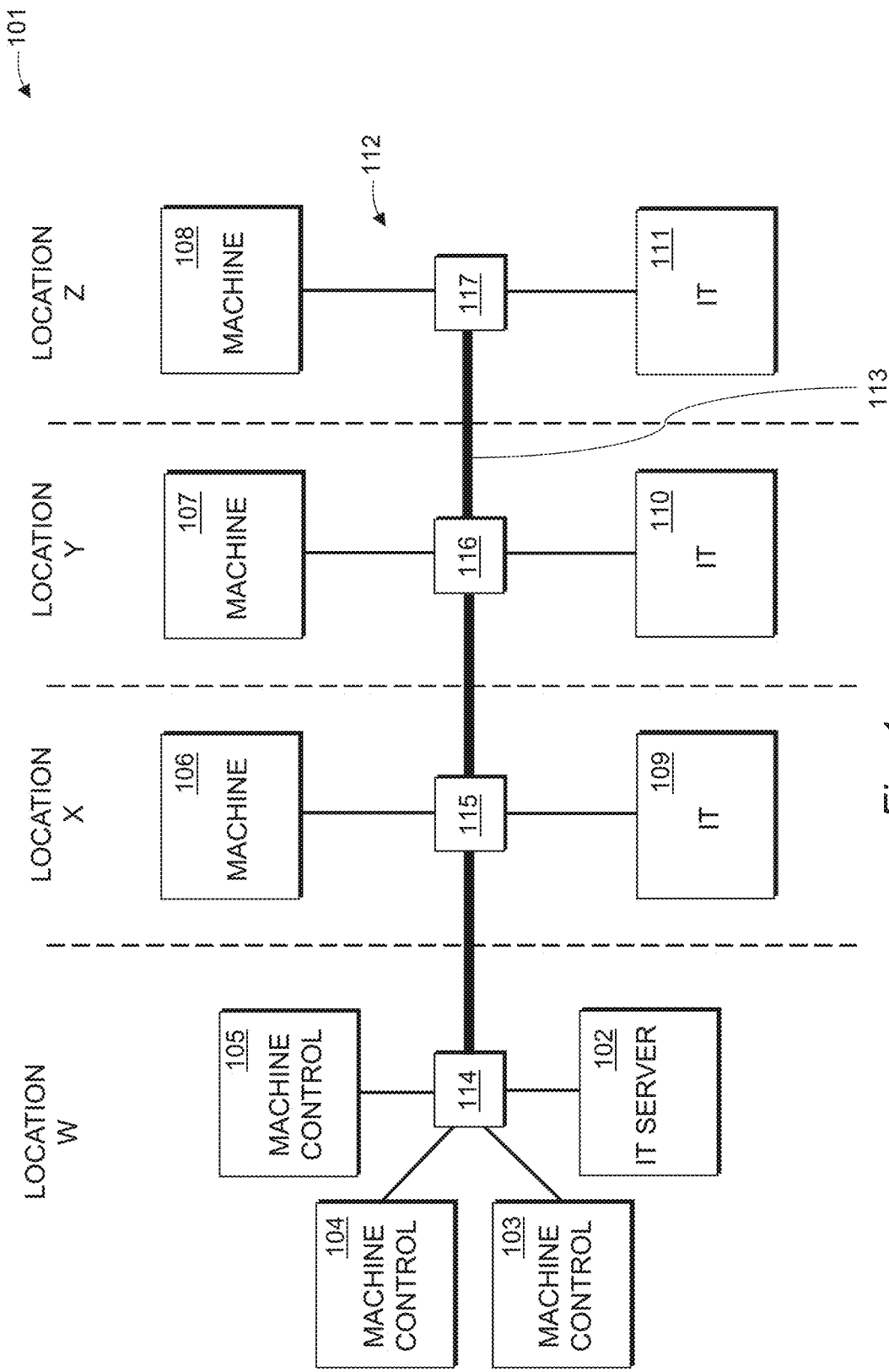
FIG. 1 shows schematically an example of a communications network embodying an aspect of the present disclosure.

Networked devices may communicate across a network using an Ethernet protocol stack. Ethernet advantageously allows efficient use of network bandwidth through packet switching, supports multicast and broadcast traffic, and the network infrastructure is already widely deployed and commonly supported by devices and so is readily available for networking of devices. In particular, packet switching in Ethernet permits link infrastructure to have a 'backbone'/'bus' configuration, whereby different data channels may be served by common infrastructure, i.e., network cabling/switches. This may advantageously minimise the physical infrastructure required to network devices.

A disadvantage of conventional Ethernet communications is packet arrival jitter, which results from the sharing of the same medium time-space domain by multiple data channels, whereby contention is resolved by waiting queues, and overloading results in frame or packet dropping. Conventional Ethernet may thus be well suited to efficiently carrying high-volume, time-insensitive, low-integrity data, but less well suited to time-sensitive or otherwise critical data. For example, conventional Ethernet may be unsuited to operational technology (OT) networking, e.g., for communicating controllers and machines in a factory, because such technology typically requires relatively high timing precision and high-integrity communications.

Conventionally therefore such time-sensitive/critical traffic, e.g., in OT networking, may be carried by dedicated transport networks, e.g., synchronous digital hierarchy (SDH), OTN, which have focussed on providing reserved capacity and constant-bit-rate (CBR) services to customers end-to-end, without going through a packet layer. In such architectures, the physical layer is a transport-specific, time-division multiplex (TDM) system which uses specific framing, signalling, bit rate (e.g., 2.5 Gbps-10 Gbps, lambda) tailored to long-haul transmissions (long frames, higher-order modulation formats, FEC). Client signals of different traffic classes are mapped to separate, reserved, time slots, which are again switched to other time slots at network junctions.

Due to their long-haul focus, such systems are relatively complex. But their clients may be devices with Ethernet ports. Ethernet is cheap, and already widely deployed. Therefore, rather than installing a dedicated network like OTN, Ethernet enhanced with the capability to deliver deterministic services has the potential to provide convenient networking of such traffic.

An approach to delivering deterministic services via Ethernet is described by IEEE 802.1Q-2018, whereby packet flows are assigned a time slot in a global calendar and each switch in the forwarding path must open a gate for the flow at exactly the time when it arrives at the switch. The global schedule must ensure that no other flow for the same outgoing interface arrives at the switch in the same timeslot. This approach disadvantageously requires that the switches must be accurately time-synchronised for the gates to be synchronised, and the global scheduler must consider switch-internal forwarding delays and cable lengths (propagation delays), because they influence packet arrival times. However, the coordination of the schedules causes a reasonable complexity burden throughout the whole network. Thus, this approach becomes impractically complex with scale, and is difficult to implement at large scales with many data flows, e.g., in large factories comprising large numbers of machines and associated controllers.

Aspects of the present disclosure thus relate to methods and systems for concurrent packet and circuit switching across common Ethernet physical layer (64-bit time slots+ line code). In particular, an aspect of the present disclosure implements a time-sensitive network (TSN) over a TDM backbone architecture utilised with a TDM shim layer inserted into the Ethernet protocol stack between the PHY and the MAC layers. The TDM shim layer forks traffic classes (e.g., normal packet-switched traffic and TSN/CBR traffic) at a standardized interface between PHY and MAC. TSN traffic may thereby bypass the non-deterministic Ethernet packet-switching layer and be forwarded with constant delay, while normal, packet, traffic is forwarded via the MAC layer and packet-switching mechanisms.

Aspects of the proposal may thus advantageously provide an efficient means for transporting both TSN/CBR traffic and conventional packet-switched traffic via shared Ethernet physical layer infrastructure.

Referring firstly to FIG. 1, an installation of networked devices 101 embodying an aspect of the present disclosure comprises a plurality of physical client devices, 102 to 111, and a communications network, in the form of an Ethernet bus indicated generally at 112, for networking the client devices 102 to 111.

The plurality of physical client devices 102 to 111 include a plurality of machine controller and machine pairs, 103-106, 104-107, and 105-108, and a plurality of IT devices 109, 110, 111, and an associated IT server 102. The plurality of client devices 102 to 111 are distributed across a plurality of physical locations W to Z.

Installation 101 may thus represent an installation in a factory, whereby machines 106 to 108 may represent industrial process machines, e.g., automated assembly machines, controller by machine controllers 103 to 105 respectively, and IT devices 109 to 111 may represent other networked devices, e.g., closed-circuit security cameras, communicating with common IT server 102, which may, for example, be a camera controller with a video recording and/or display function. Machine-controller pairs 103-106, 104-107, and 105-108 may require high timing precision and high-integrity communications to facilitate proper operation of the machines 106 to 108, which may often involve relatively low volumes of data. Whereas IT devices 109 to 111 may require high-volume data exchange with IT server 102, but may allow time-insensitive, low-integrity communications.

Ethernet bus 112 comprises a backbone medium 113, e.g., an optical fibre network, and a plurality of switches 114 to 117 for interfacing the client devices 102 to 111 with the backbone medium 113 and for routing communications along the backbone medium 113 between the connected devices. As will be described in further detail with reference to later Figures, Ethernet bus 112 operates as an enhanced Ethernet physical layer network, whereby TSN traffic between the machine-machine controller pairs 103-106, 104-107, and 105-108, and conventional packet-switched traffic between the IT devices 109 to 111 and IT server 102, is communicated concurrently. Thus, the shared communications network 112 may carry both the low-volume, time-sensitive, high-integrity traffic demanded by the machine-machine controller pairs, and the high-volume, relatively time-insensitive, low-integrity data between the IT devices and the IT server.

Figure 2:
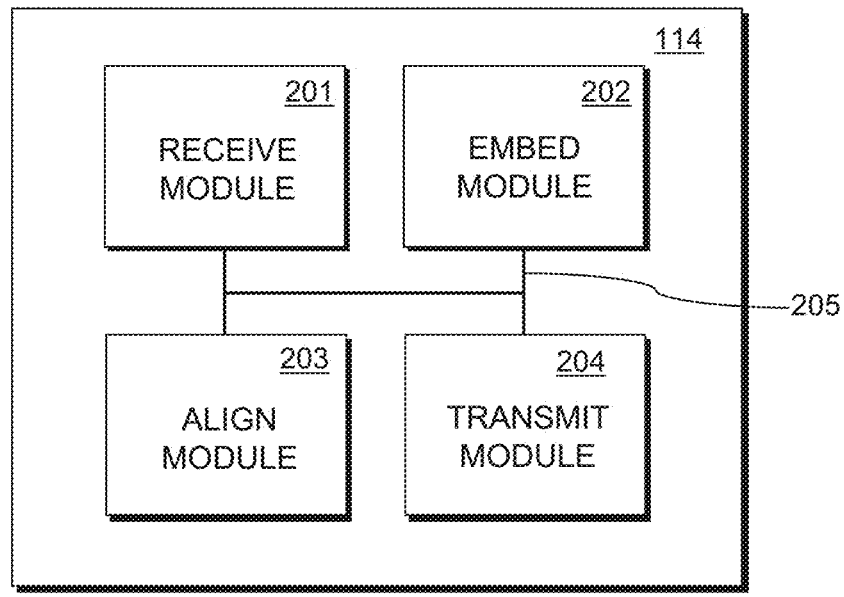
FIG. 2 shows schematically example functionality of a switch of the communications network.

Referring next to FIG. 2, in examples each of switches 114 to 117 comprises a plurality of functional modules 201 to 204 for interfacing the client devices 102 to 111 with the backbone medium 113 and for routing communications along the backbone medium 113 between the client devices 102 to 111. FIG. 2 depicts switch 114. In examples switches 115 to 117 are substantially the same as switch 114.

Receiver module 201 is functional to receive client data from the client devices for transmission via the Ethernet bus 112. In the example of switch 114, receiver module 201 is functional to receive control data from machine controllers 103 to 105, and to receive data exchanged between IT server 102 and IT devices 109 to 111.

Embedding module 202 is functional to embed client data received from one or more of the client devices 102 to 111 into a client bit stream and schedule the client bit stream into time slots of the Ethernet bus 112.

Aligning module 203 is functional to align a bit rate of the received client data for transmission to a net bit rate of the Ethernet bus 112 and align a gross bit rate of the Ethernet bus to local clocks of nodes of the Ethernet bus, e.g., to local clocks of switches 114 to 117.

Transmitting module 204 is functional to selectively transmit the embedded client data over the Ethernet bus 112 by one of packet-switching or non-packet-switching transmission based on the originating client device.

The components 201 to 204 of the switch 114 are in communication via system bus 205.

In examples, the modules 201 to 204 may be supported by mutually distinct hardware. For example, each module 201 to 204 may comprise a respective processor and computer memory, etc. In other example, to be described in detail with reference to FIG. 3, the functionality of the modules 201 to 204 may be supported by common hardware, e.g., by a processor and a memory that is common to the modules 201 to 204.

Figure 3:
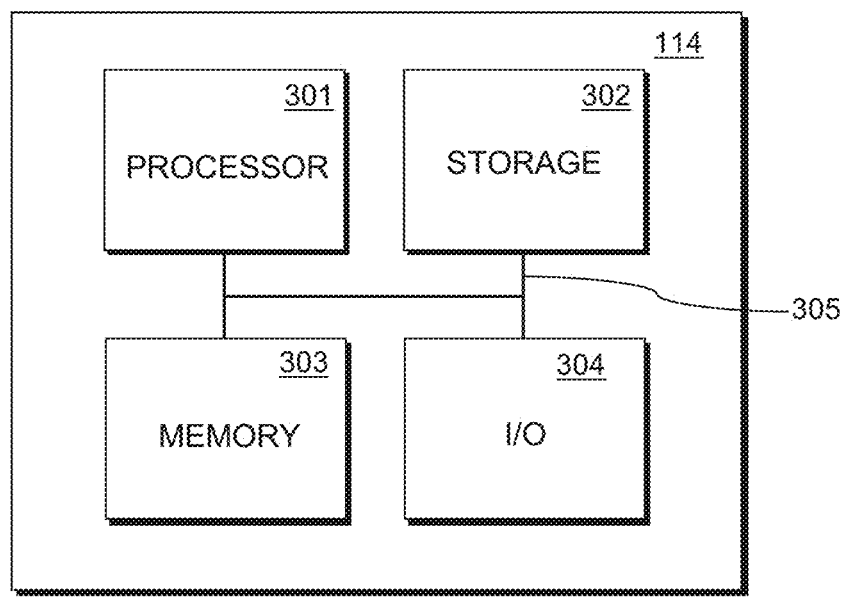
FIG. 3 shows schematically example components of the switch.

Referring next to FIG. 3, in examples, switch 114 comprises processor 301, storage 302, memory 303, and input/output interface 304. In examples, components 301 to 304 support the functions of functional modules 201 to 204.

Processor 301 is configured for execution of instructions of a computer program for processing data via an Ethernet protocol stack and transmitting data via the Ethernet bus 112. Storage 302 is configured for non-volatile storage of computer programs for execution by the processor 301. In examples, the computer program for processing data via an Ethernet protocol stack and transmitting data via the Ethernet bus 112 is stored in storage 302. Memory 303 is configured as read/write memory for storage of operational data associated with computer programs executed by the processor 301. Input/output interface(s) 304 is provided for communicating switch 114 with client devices 102 to 111 and with backbone medium 113. For example, input/output interfaces(s) 304 may comprise plural Ethernet ports for connecting to the client devices 102 to 104 and the backbone medium 113. The components 301 to are in communication via system bus 305.

Figure 4:
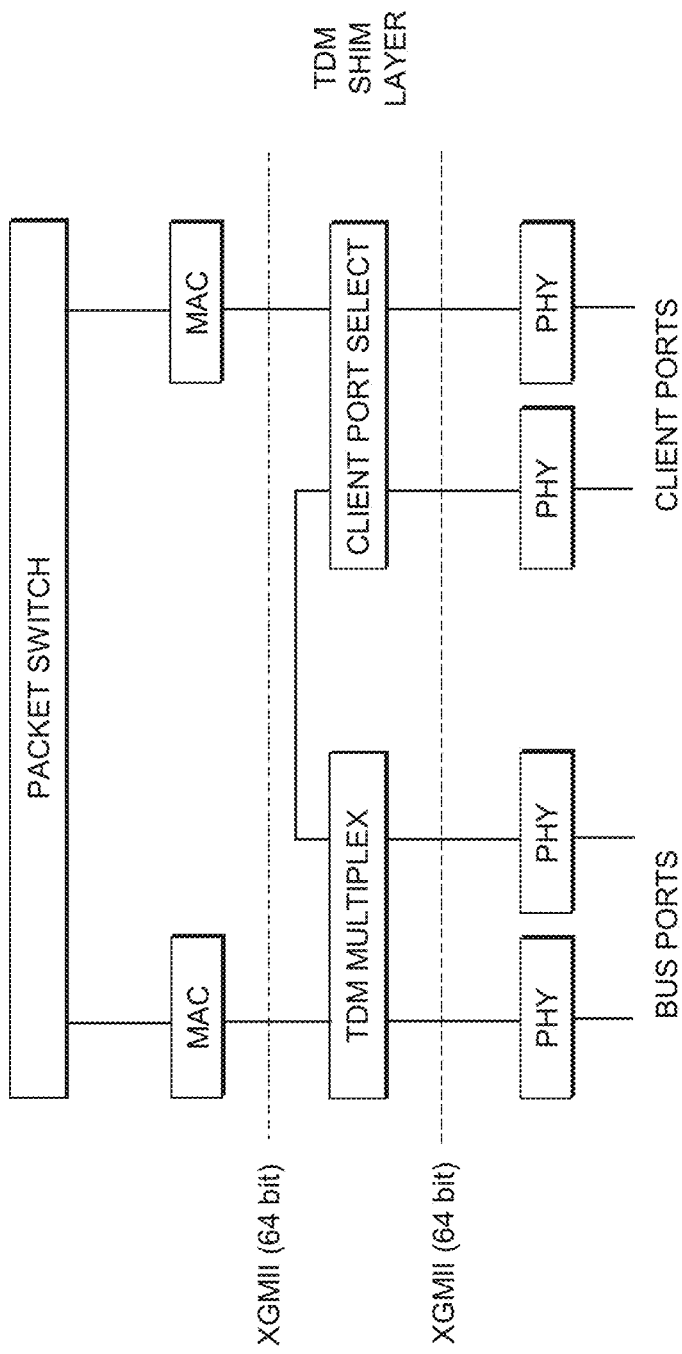
FIG. 4 shows schematically a layer model of the switch.

Referring next to FIG. 4, each of the switches 114 to 117 of the communications network 112 processes client data according to an enhanced Ethernet protocol stack, to communicate the client devices 102 to 111 with the backbone. The enhanced Ethernet protocol stack comprises a TDM shim layer inserted between the PHY and MAC layers. FIG. 4 depicts an example layer model implemented by each of the switches 114 to 117, such as switch 114.

The TDM shim layer forks traffic at a standardized interface between the PHY and MAC layers. By default, the TDM shim layer acts like a best effort (BE) packet switched network, i.e., all time slots are available for best effort IT traffic (traffic between the IT devices 109 to 111 and the IT server 102). On request, the TDM shim layer provides TDM connections between dedicated client Ethernet ports of the switches. The selected ports bypass the MAC layer and the packet-switching engine and are directly forwarded as a bit stream to the TDM scheduler with constant delay. Other BE ports remain packet multiplexed, and the combined BE upstream is fed to the TDM layer, where it occupies the remaining unreserved time slots.

In the layer model of FIG. 4, the client port selector decides which client port(s) are TDM circuit switched and which port(s) are forwarded to the packet switch (best effort). The TDM bus multiplexor decides which TDM slots are forwarded to the other bus interface (transit), which are add/drop traffic to selected client ports, and which are forwarded to the packet switch (best effort). The TDM shim layer implements a slot synchronous bus by (1) embedding client Ethernet frames into a client bit stream, and (2) scheduling the client bit stream into bus slots. To do so it may (3) align the client bit rate to the net rate of the bus, and (4) align the gross rate of the bus to the local clocks of traversed nodes.

Figure 5:
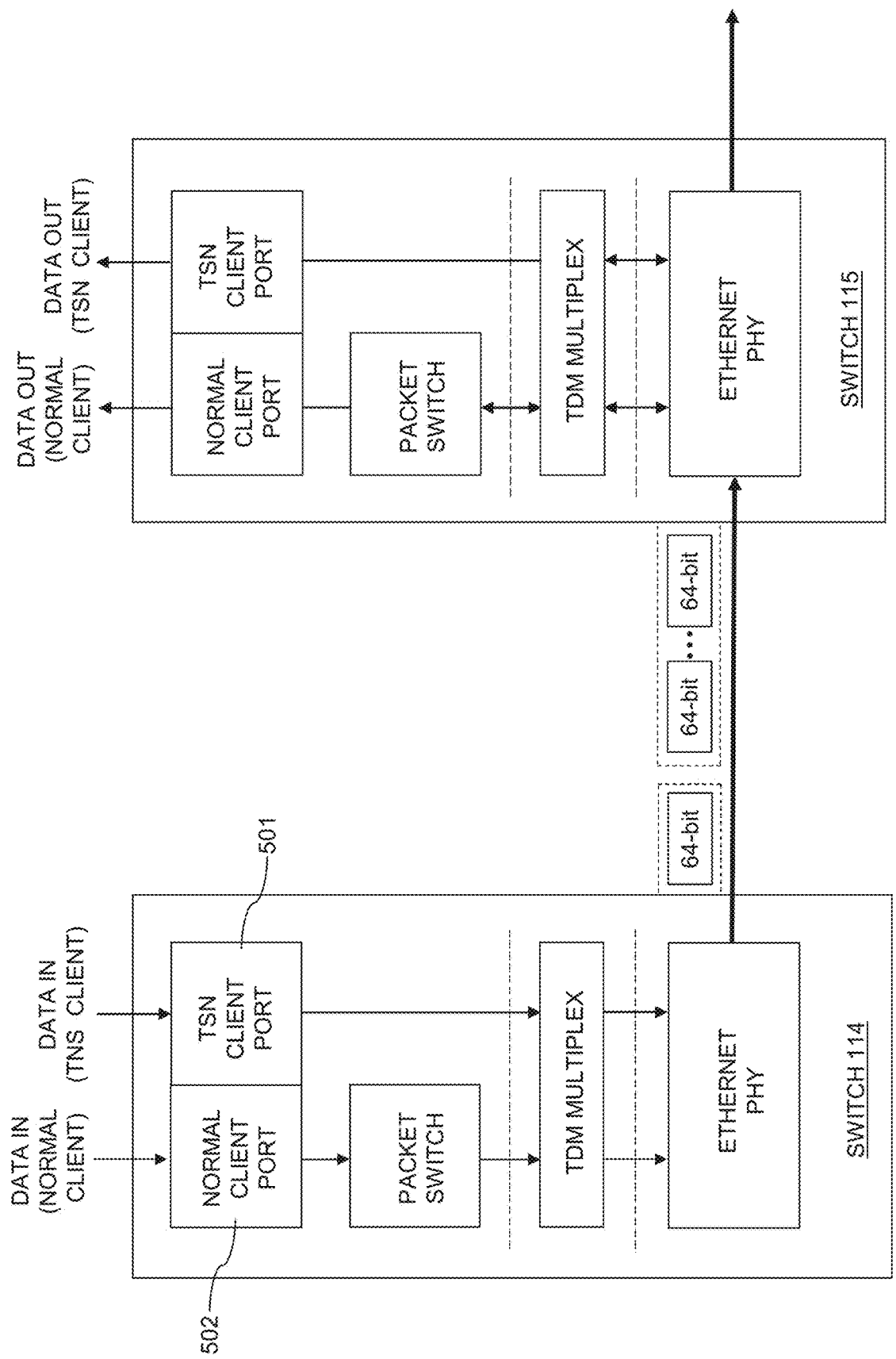
FIG. 5 shows schematically a packet traversal through switches of the communications network.

Referring next to FIG. 5, the Figure shows a packet walk-through from a sender node, e.g., switch 114, to a receiver node, e.g., switch 115. The sender node, e.g., switch 114, provides separate service interfaces to different service classes, e.g., a first Ethernet port 501 to a TSN user, e.g., machine controller 103, and a second Ethernet port 502 to a normal packet user, e.g., IT server 102. The receiver node, e.g., switch 115, similarly provides two ports for interfacing the Ethernet bus 112 with the machine 105 and with the IT device 109.

Packets from the normal packet user, e.g., IT server 102, are received at the port 502 and pass through the Ethernet MAC layer to the packet switch, where they are packet multiplexed with traffic from other ports. Packets of the combined traffic are concatenated, omitting idle periods (empty queues in the switch), and the result in segmented into blocks that match the payload size of the overlay frame.

A bitstream from a TSN user, e.g., machine controller 102, is received at the port 501, and passed directly to the TDM shim layer. The bitstream undergoes a cross-connect (XC) function, which periodically maps a constant number of bits into uniformly sized an overlay frame (with the exception that occasionally a bit more or less is transmitted to cope with clock tolerances). This process thus takes a stream of client Ethernet frames of arbitrary size and converts them into uniformly sized transport frame containers (the overlay frames) for transmission across an integer number of Ethernet time slots. The embedding of bits received from the TSN client into overlay frames for transmission will be described further with particular reference to FIGS. 7 to 9.

The TDM multiplexer, which is aware of the Ethernet timeslots which are reserved for a TSN connection, arbitrates between the packets received from the normal client at port 502 and the overlay frame-packaged bitstream originating from the TSN client at port 501. If the next slot on the Ethernet bus is reserved for the TSN connection, it forwards the respective overlay frame of bits from the TSN client at port 501 to the PHY layer for encoding and transmission. If the next slot is not reserved, it forwards the next segment from the TDM packet function to the Ethernet PHY layer.

At the receive node, e.g., switch 115, TSN overlay frames pass bottom-up through the Ethernet physical layer and are delivered by the Ethernet PHY layer to the TDM function. If TSN data is destined for a user local to the switch, e.g., machine 106, the TDM XC function demultiplexes the frames, concatenates the frame payloads and cleans the TSN signal from the jitter introduced by the periodic mapping in the sender. The reconstructed bit stream, containing all data and idle bits, is forwarded to the user. This method thus provides an isochronous connection between the sending and receiving users, e.g., between machine controller 103 and machine 106. If, alternatively, the TSN data is destined for a user downstream of the switch, e.g., for machine 107 connected to switch 116, the TDM multiplexor leaves the overlay frame as is and forwards the overlay frame, interleaved with newly inserted traffic, to the other bus interface. Inter frame gaps between the overlay frames are used to align the clock tolerances between the upstream and downstream bus segments.

Packet overlay frames also pass bottom-up through the Ethernet physical layer in the receiver and are delivered to the TDM packet layer function. The TDM packet layer function reassembles the segments into the original MAC packets and forwards them to the packet switch. If the packet is destined for a user local to the switch, it is forwarded to the respective outgoing port. If however the packet is destined for a downstream user, it is multiplexed with other (IT) traffic and returned to the TDM packet function for re-insertion into the TDM schedule.

Figure 6:
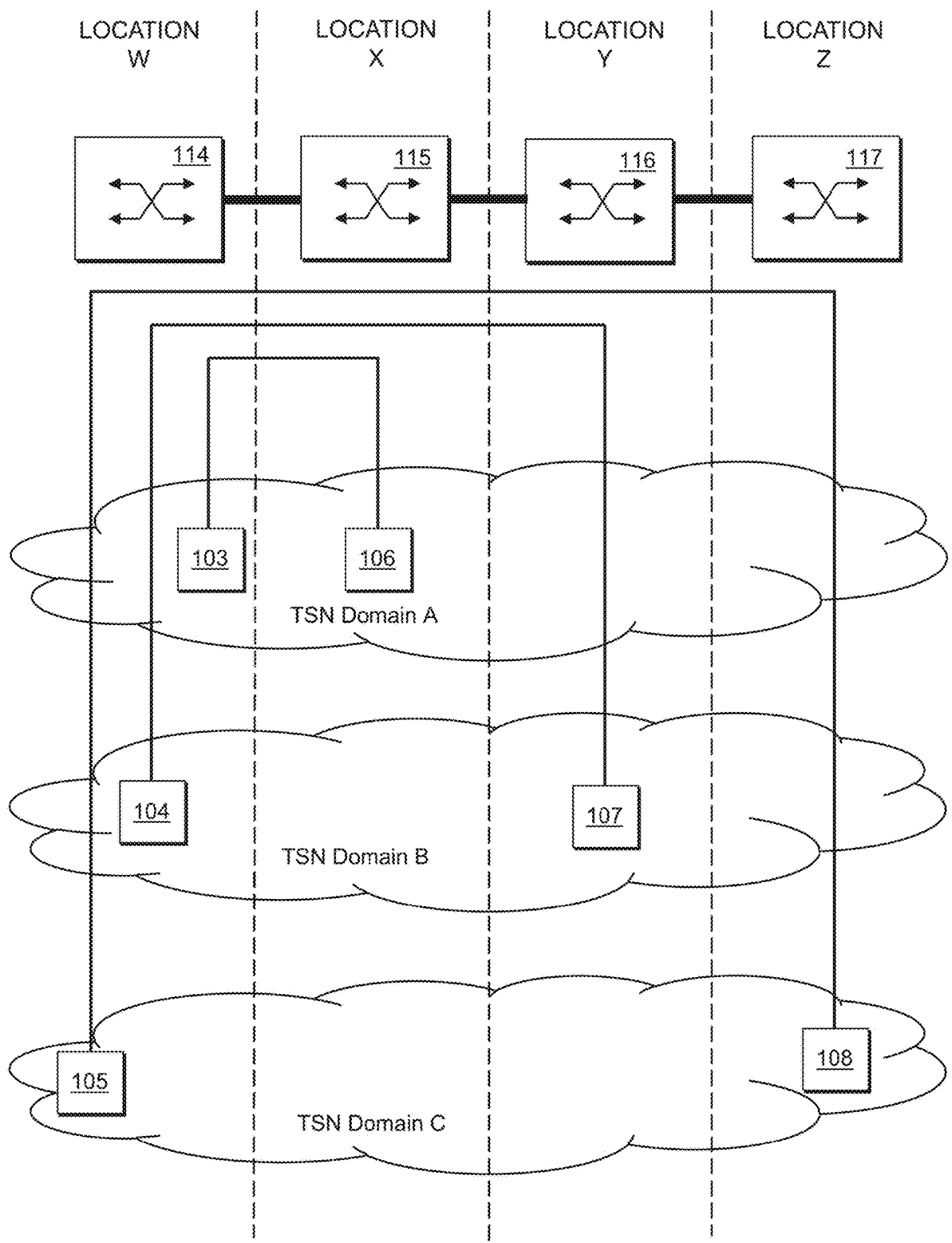
FIG. 6 shows schematically isochronous connections provided between nodes in the communications network.

Referring next to FIG. 6, from a TSN perspective, a TDM connection functions like a transparent link. All data and control traffic, scheduled or not, can be run over the TDM connection under full control and responsibility of the TSN domain. Different TSN domains use different time slots on the same backbone. The connections are transparent, in the send that they carry any Ethernet frame as is, without regard to any protocol header. The connections are asynchronous with respect to the backbone clock. Any TSN domain can handle its own notion of time and frequency (protocol, precision, clock master). The backbone may provide time services, like e.g., SyncE, or a PTP boundary clock, but the TSN domains are free to decide whether, and at which precision, to use the services.

The transparent connection decouples the TSN time domain from the physical location of the devices. In FIG. 6, the TSN domain A is present in location W, i.e., the machine controller 103, and in location X, i.e., the machine 106. Similarly, TSN domain B is present in location W, i.e., the machine controller 103, and in location Y, i.e., the machine 107, and TSN domain C is present in location W, i.e., the machine controller 103, and in location Z, i.e., the machine 108. Scheduled traffic may thus flow between the islands sharing the common domain, e.g., islands W and X at sub-microsecond precision without interference from the TSN serving other domains or the IT traffic.

A TDM connection may span over multiple intermediate nodes, e.g., machine controller 103 at location W and machine 108 at location Z. To avoid repeated re-scheduling, the backbone links are organised as a slot synchronous bus over multiple nodes. Slots of arriving connected are dropped to their respective client ports, new connections are interleaved into the bypassing bus schedule, whereas transiting connections are not processed at all, the slots are just forwarded with the bus. Unreserved slots (BE) are dropped to and re-inserted from the packet switch in every node.

Figure 7:
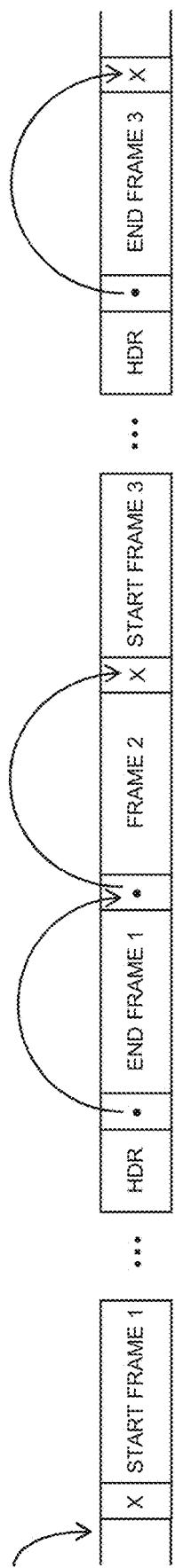
FIG. 7 shows schematically grouping of client frames into overlay frames for transmission via the communications network.

Referring next to FIG. 7, as previously described, the TDM shim layer introduces constant size transport overlay frames, analogous to containers, by embedding client Ethernet frames into a bitstream for transmission via the Ethernet bus. FIG. 7 depicts a stream of Ethernet frames packaged in overlay frames for transmission via the Ethernet bus.

In order to minimise latency in transmission via the Ethernet bus, the size of the overlay frames/containers may advantageously be minimised. Conversely however each overlay frame/container may have certain control information embedded in a header for controlling processing of the overlay frame by each network node. The relation payload body to header size defines the resource efficiency. Thus, it is advantageous to use a minimalistic header encoding to minimise the size of overlay frames/containers.

In implementations therefore, a pointer-based client frame alignment is employed for aligning client frames with respect to the overlay frames. In the implementation, one-byte frame delimiting pointers (FDP) are employed for pointing to subsequent frame delimits Referring to FIG. 7, in the implementations, an anchor FDP is placed in the header portion of each overlay frame, which points to a first inter-frame gap (IFG) between client frames, where a second FDP is located which points to the next IFG, which is repeated until the end of the slot, wherein a NULL pointer marks the end of the slot. The FDP encoding may be absolute with respect to the overlay frame or relative as offset to the current position. The final FDP may be indicated by a special encoding that points to an invalid position.

FIG. 7 depicts a stream of overlay frames, comprising a tail-end of a first overlay frame, a second full overlay frame, and a head-end of a third overlay frame. The semantic of FDP pointers is indicated by the arrows, where the X-marked FDP indicates the end of the chain.

Figure 8:
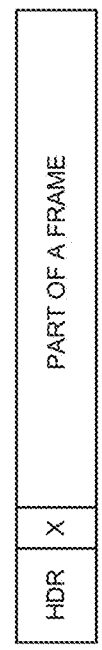
FIG. 8 shows schematically an example of an overlay frame for transmission via the communications network.

Referring next to FIG. 8, in some instances the client frames may be larger than the overlay frame sizes. In such instances the overlay frames may include no post-header FDP. In this case the anchor FDP included in the header may be employed to indicate the end of the chain.

Figure 9:
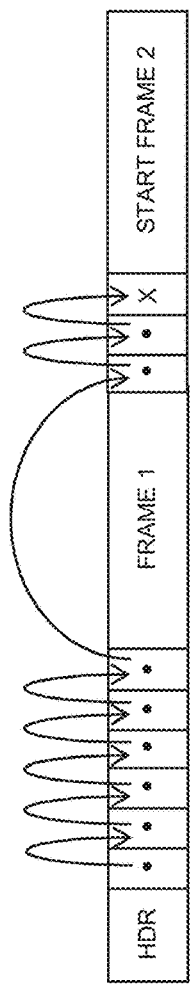
FIG. 9 shows schematically a further example of an overlay frame for transmission via the communications network.

Referring next to FIG. 9, in implementations, for isochronous traffic classes it is advantageous to convey IFGs between client frames within the overlay frames.

The example embedding depicted with reference to FIG. 9 may be satisfactory in implementations where jitter insensitive traffic is carried, and where the incoming client frames are stored in a queue and then are embedded back-to-back in the overlay frames without regard to the original IFGs. For isochronous traffic however the IFGs may advantageously also be conveyed within the overlay frames.

Thus, referring to FIG. 9, in implementations, in case of an IFG between incoming client frames that exceeds a size of a single FDP, e.g., exceeding one-byte, the original IFG may be replicated by insertion of multiple FDPs; each FDO incrementing the current position by one. The FDP encoding in one-byer pointers advantageously enables the representation of IFGs at single byte granularity. IFGs in conventional Ethernet may typically be 12 byte, or at least 5 byte. Thus, by this method, there may typically be sufficient space between consecutive client frames to insert at least one single-byte FDP. Thus, by this method, the transmission may preserve the number of bytes not only in the original client frames, but also in the IFGs, and may thereby advantageously approach jitter-free transmission.

Figure 10:
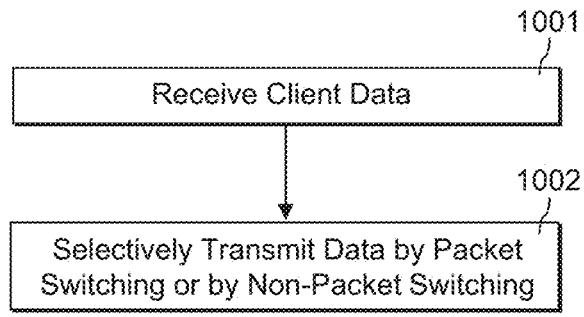
FIG. 10 shows schematically example processes involved in transmitting data via the communications network, which includes a process of selectively transmitting data.

Referring next to FIG. 10, in examples, a method for transmitting data via the communications network 101 comprises two stages. The method may be implemented, for example, by switch 114.

At stage 1001, client data is received for transmission. For example, stage 1001 may involve the receiver module 201 of switch 114 receiving a client bitstream from a TNS user, such as machine controller 103 via port 501, and may further involve switch 114 receiving separately packet data from a normal user, such as IT server 102 via port 502.

At stage 1002, the switch 114 selectively transmits the client data received at stage 801 via the Ethernet bus to a downstream node, e.g., to switch 115, via one of packet-switching or non-packet switching, wherein the choice of the transmission technique used is based on an identity of the originating client device.

For example, transmitting module 204 of switch 114 may use an identification of a port from which client data is received as a proxy for an identity of the originating client device. For example, switch 114 may transmit client data received via port 501 (e.g., time-sensitive data received from machine controller 103) via non-packet switching, and transmit client data received via port 502 (e.g., non-time-sensitive data received from IT server 102) via packet switching.

Alternatively, a transmitting node, such as switch 114, may utilise metadata associated with the client data, e.g., ID data included in the header of an overlay frame to determine an identity of an originating device, and so select a mode of transmission. This alternative technique may be particularly useful where the sending node does not receive data directly from the client devices, such as switch 115, as the switch may still identify an origin of client data, and thereby select an appropriate mode of transmission.

Thus, it may be understood that the disclosed method of selectively transmitting client data via one of packet-switching or non-packet switching may advantageously provide a means for acceptably communicating both time-sensitive, e.g., CBR services, and conventional Ethernet packet services over a shared Ethernet-based communication channel.

Figure 11:
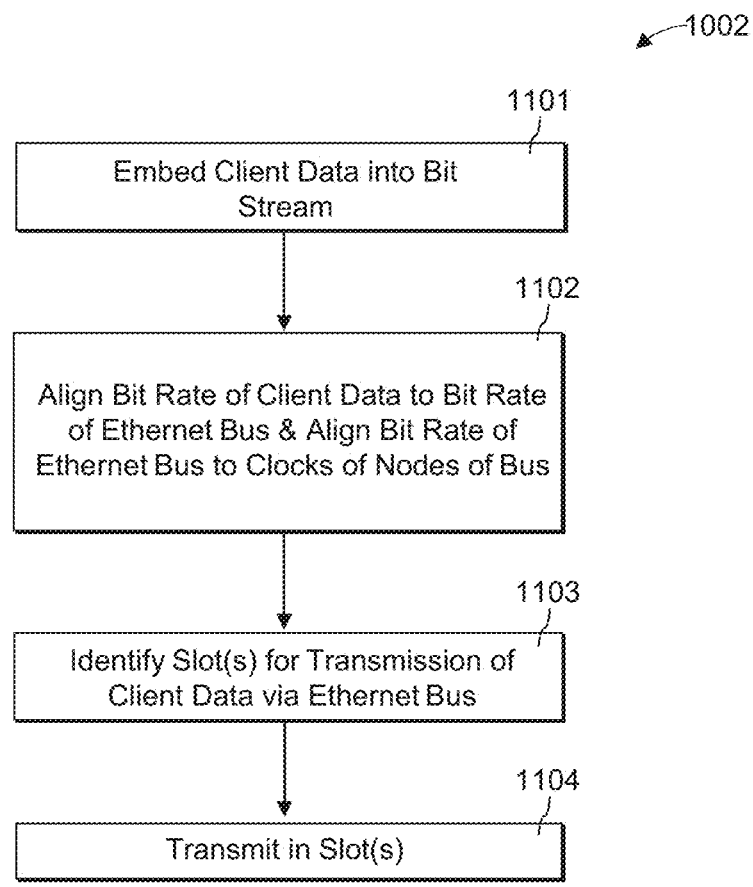
FIG. 11 shows schematically example processes involved in the process of selectively transmitting client data.

Referring finally to FIG. 11, in examples, stage 1002 for selectively transmitting client data via the Ethernet bus may comprise one or more of four processes.

At stage 1101 the node, such as switch 114, may embed the received client data into a bit stream. For example, stage 1101 may involve the embedding module 202 grouping a plurality of bits of client data into overlay frames of fixed size.

At stage 1102, the aligning module 203 of switch 114 may align a bit rate of client data to a net bit rate of the Ethernet bus, and aligning a gross rate of the Ethernet bus to local clocks of nodes of the Ethernet bus. Thus, referring to FIG. 9, stage 1102 may involve insertion of plural FDPs to obtain IFGs of desired size in an overlay frame.

At stage 1103, the transmitting module 204 of switch 114 may identify time slots of the Ethernet bus for transmission of the client data. For example, referring to FIG. 2. the TDM multiplexor may identify time slots reserved for transmission of TNS data via the Ethernet bus.

At stage 1104, the transmitting module 204 of switch 114 may subsequently transmit the client data in the overlay frames in the identified time slots to a receiving node, e.g., via one or more of switches 115 to 117.

Example embodiments are described herein in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including,"

when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The invention claimed is:

1. A method for processing data in an Ethernet protocol stack, comprising:
   receiving, at a processing device, client data for transmission via an Ethernet bus, and
   determining, by the processing device, whether to transmit the client data over the Ethernet bus by one of a packet switching or a non-packet-switching transmission mode based on an identity of an originating client device, and
   in response to determining to transmit the client data over the Ethernet bus by non-packet-switching transmission, bypassing a MAC layer by using a time-division multiplexing shim layer between a PHY layer and a MAC layer.

2. The method of claim 1, wherein transmitting the client data by non-packet-switching transmission comprises embedding the client data into a client bit stream and scheduling the client bit stream into Ethernet bus slots.

3. The method of claim 2, wherein the embedding client data comprises aligning a bit rate of the client data to a net bit rate of the Ethernet bus, and aligning a gross rate of the Ethernet bus to local clocks of nodes of the Ethernet bus.

4. The method of claim 1, wherein the receiving client data comprises receiving the client data from a client device via a first interface and receiving client data from a second client device via a second interface.

5. The method of claim 1, wherein the selectively transmitting the client data comprises defining a grouping of bits of the client data, associating control data defining an identity of an originating physical layer device with the grouping, and transmitting the grouping of client data by one of packet switching or non-packet-switching transmission based on the control data.

6. A non-transitory computer-readable data carrier storing a computer program, which when executed by at least one processor, causes an apparatus including the at least one processor to perform the method of claim 1.

7. An apparatus for processing data in an Ethernet protocol stack, comprising:
   at least one processor; and
   at least one memory comprising machine-readable instructions executable by the processor to cause the apparatus to perform,
   receiving client data for transmission via an Ethernet bus, and
   determining whether to transmit the client data over the Ethernet bus by one of packet switching or non-packet-switching transmission based on an identity of an originating client device, and
   in response to determining to transmit the client data over the Ethernet bus by non-packet-switching transmission, bypassing MAC layer by using a time-division multiplexing shim layer between a PHY layer and a MAC layer.

8. The apparatus of claim 7, wherein the at least one memory and the machine-readable instructions are configured to, with the at least one processor, cause the apparatus at least to transmit the data by non-packet-switching transmission by embedding the client data into a client bit stream and scheduling the client bit stream into Ethernet bus slots.

9. The apparatus of claim 8, wherein the at least one memory and the machine-readable instructions are configured to, with the at least one processor, cause the apparatus at least to perform the embedding client data by aligning a bit rate of the client data to a net bit rate of the Ethernet bus, and aligning a gross rate of the Ethernet bus to local clocks of nodes of the Ethernet bus.

10. The apparatus of claim 7, wherein the at least one memory and the machine-readable instructions are configured to, with the at least one processor, cause the apparatus at least to perform the receiving client data by receiving client data from a first client device via a first interface and receiving client data from a second client device via a second interface.

11. The apparatus of claim 7, wherein the at least one memory and the machine-readable instructions are configured to, with the at least one processor, cause the apparatus at least to perform the selectively transmitting the client data by defining a grouping of bits of the client data, associating control data defining an identity of an originating physical layer device with the grouping, and transmitting the grouping of client data by one of packet switching or non-packet-switching transmission based on the control data.

* * * * *